United States Patent
Lee et al.

(10) Patent No.: US 9,673,489 B2
(45) Date of Patent: Jun. 6, 2017

(54) BATTERY PACK

(71) Applicant: SAMSUNG SDI CO., LTD., Yongin-si, Gyeonggi-do (KR)

(72) Inventors: Eunjoong Lee, Yongin-si (KR); Daehyeong Yoo, Yongin-si (KR); Hanjun Wang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 241 days.

(21) Appl. No.: 14/532,210

(22) Filed: Nov. 4, 2014

(65) Prior Publication Data

US 2015/0140362 A1 May 21, 2015

(30) Foreign Application Priority Data

Nov. 20, 2013 (KR) .................. 10-2013-0141786

(51) Int. Cl.
| H01M 10/42 | (2006.01) |
| H01M 2/20 | (2006.01) |
| H01M 2/02 | (2006.01) |
| H01M 2/10 | (2006.01) |

(52) U.S. Cl.
CPC ..... *H01M 10/4257* (2013.01); *H01M 2/0267* (2013.01); *H01M 2/1066* (2013.01); *H01M 2/204* (2013.01); *H01M 2/02* (2013.01); *H01M 2/024* (2013.01); *H01M 2/0207* (2013.01); *H01M 2/0242* (2013.01); *H01M 2/0245* (2013.01); *H01M 2/1016* (2013.01)

(58) Field of Classification Search
CPC .................. H01M 2/024; H01M 10/4257
See application file for complete search history.

(56) References Cited

U.S. PATENT DOCUMENTS

| 5,503,483 A * | 4/1996 | Petteruti | B41J 3/36 346/136 |
| 6,391,490 B1 * | 5/2002 | Aoi | H01M 2/0225 429/176 |
| 2004/0197512 A1 | 10/2004 | Gavel et al. | |
| 2006/0099504 A1 * | 5/2006 | Kim | H01M 2/0275 429/176 |
| 2006/0244416 A1 * | 11/2006 | Yong | H01M 2/0215 320/112 |
| 2008/0305326 A1 | 12/2008 | Gavel et al. | |
| 2009/0134293 A1 * | 5/2009 | Fujikawa | G06F 1/187 248/225.11 |
| 2009/0187495 A1 * | 7/2009 | Bertness | G06Q 10/087 705/28 |
| 2011/0020578 A1 | 1/2011 | Gavel et al. | |

(Continued)

FOREIGN PATENT DOCUMENTS

| JP | 04-269785 A | 9/1992 |
| KR | 10-2004-0030538 A | 4/2004 |
| KR | 10-2006-0072537 A | 6/2006 |

*Primary Examiner* — Jeremiah Smith
(74) *Attorney, Agent, or Firm* — Lee & Morse, P.C.

(57) ABSTRACT

A battery pack includes at least one battery cell, a protection circuit module electrically connected to the at least one battery cell, and a frame including the at least one battery cell and the protection circuit module. The battery pack also includes a label adjacent to the at least one battery cell, protection circuit module, and frame. The label includes a noise preventing portion in a direction different from a lengthwise direction of the frame.

14 Claims, 5 Drawing Sheets

(56) References Cited

U.S. PATENT DOCUMENTS

| | | |
|---|---|---|
| 2011/0151213 A1 | 6/2011 | Gavel et al. |
| 2011/0165388 A1 | 7/2011 | Gavel et al. |
| 2011/0165417 A1 | 7/2011 | Gavel et al. |
| 2012/0040123 A1 | 2/2012 | Gavel et al. |
| 2012/0114893 A1 | 5/2012 | Gavel et al. |
| 2012/0270074 A1* | 10/2012 | Koh .................... H01M 2/0212 429/7 |

* cited by examiner

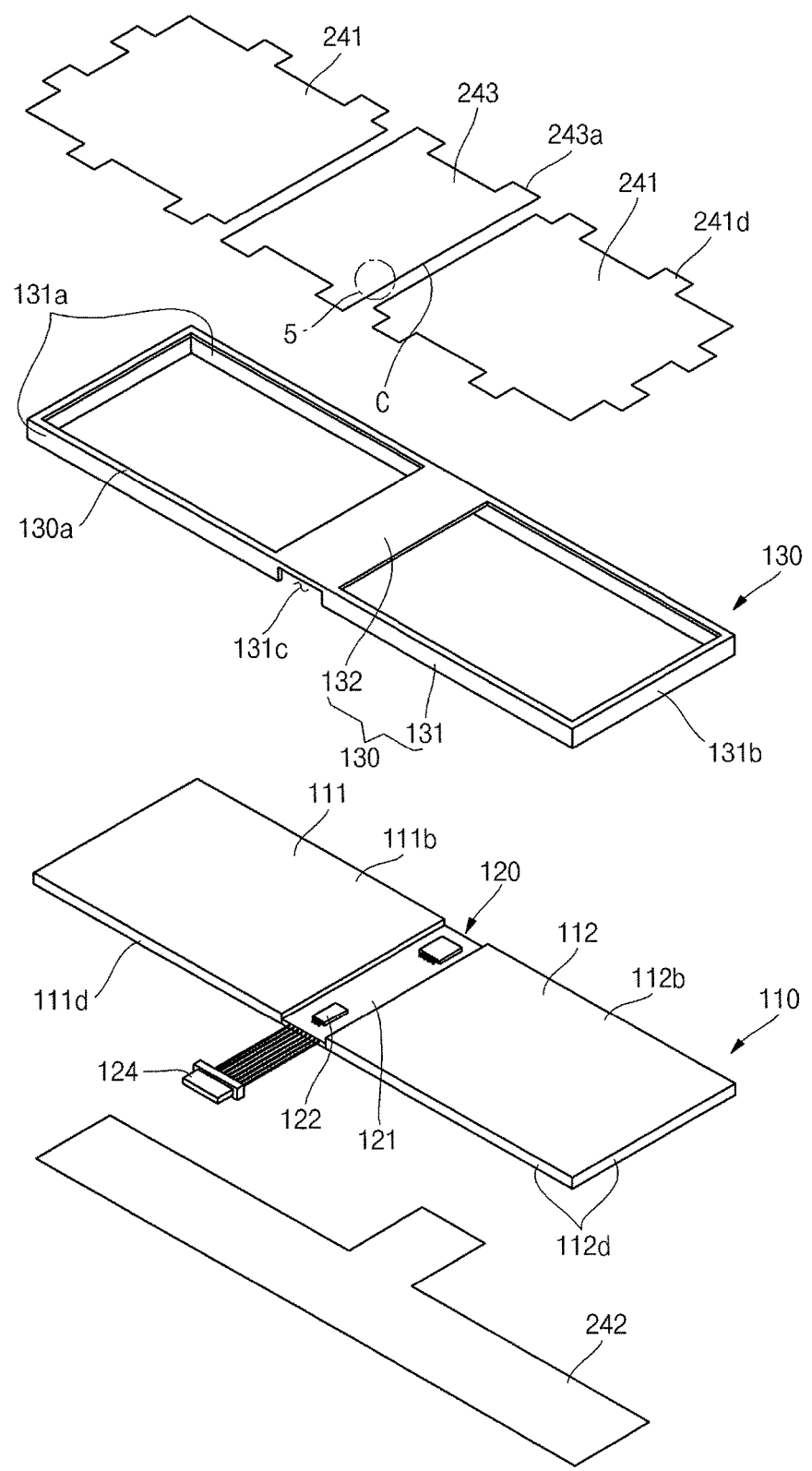

BATTERY PACK

CROSS-REFERENCE TO RELATED APPLICATION

Korean Patent Application No. 10-2013-0141786, filed on Nov. 20, 2013, entitled, "BATTERY PACK," is incorporated by reference herein in its entirety.

BACKGROUND

1. Field

One or more embodiments described herein relate to a battery.

2. Description of the Related Art

Notebook computers, mini notebook computers, net books, mobile computers, ultra mobile personal computers, portable multimedia players, and other electronic devices are often powered by a battery pack. The battery pack usually has multiple battery cells connected in series or parallel to form a portable power source. The battery pack may also have a protective circuit module for protecting the battery cells from over-charge, over-discharge, or over-current conditions. Such a module may be incorporated into a frame, with the battery cells welded to electrode tabs.

In order to be useable in modern electronic devices, battery packs should be thin. A variety of techniques have been proposed to reduce the thickness of a battery pack. One technique involves attaching a tape-like (or hard-type) label to a frame. This technique allows the battery cells and protective circuit module to be located inside and protected by the frame.

However, reducing the thickness of a battery pack does not come without a price. For example, a battery pack may become easier to bend or deform as its thickness is reduced. When a battery pack bends or deforms, noise may be generated. This may be especially true when an adhered surface of the hard-type label is released from the frame.

SUMMARY OF THE INVENTION

In accordance with one embodiment, a battery pack includes at least one battery cell; a protection circuit module electrically connected to the at least one battery cell; a frame including the at least one battery cell and the protection circuit module; and a label adjacent to the at least one battery cell, protection circuit module, and frame, wherein the label includes a noise preventing portion in a direction different from a lengthwise direction of the frame.

The noise preventing portion may include a cut-out portion in a direction different from the lengthwise direction of the frame. The cut-out portion may be between the frame and the at least one battery cell.

The noise preventing portion may include a fabric-type label. The fabric-type label may include an acetate material.

The at least one battery cell may include a first battery cell and a second battery cell, and wherein each of the first and second battery cells has at least one electrode tab. The electrode tab of the first battery cell and the electrode tab of the second battery cell may face each other, and may be connected to the protection circuit module at opposing sides of the protection circuit module.

The frame may include a first frame section including a rectangular framework, the first frame section surrounding outer surfaces of the first and second battery cells connected to the protection circuit module, and a second frame coupled to the first frame section and having a plate shape covering a first surface of the protection circuit module.

The label may include a first label covering a first surface of the first battery cell, a first surface of the second battery cell, and the second frame section, the first label section including the noise preventing portion; and a second label covering a second surface of the first battery cell opposite to the first surface of the first battery cell and a second surface of the second battery cell opposite to the first surface of the second battery cell.

The first label may include a fixing portion adhered to a portion of the first frame section and fixing the first label. The noise preventing portion may include a first cut-out portion between the first battery cell and second frame and a second cut-out portion between the second battery cell and the second frame.

The label may include a first label covering a portion of a first surface of the first battery cell and a portion of a first surface of the second battery cell; a second label covering a second surface of the first battery cell opposite to the first surface of the first battery cell and a second surface of the second battery cell opposite to the first surface of the second battery cell; and a third label that includes a fabric-type noise preventing portion covering the second frame.

The third label may cover a portion of the first surface of the first battery cell adjacent to the second frame and a portion of the first surface of the second battery cell. The third label may be made of an acetate fabric having warp threads and weft threads crossing each other, and edges of the third label are at a predetermined angle relative to the warp threads and the weft threads, the predetermined angle being different from 90°. The third label may include a fixing portion adhered to a portion of the first frame and fixing the third label.

In accordance with another embodiment, a battery pack which includes a frame; a battery cell coupled to the frame; and a first label on the battery cell and frame; and a second label on the frame adjacent the battery cell, wherein the first label and second label are independently attached to the frame to prevent the second label from exerting a force on the first label when the frame is deformed or twisted. The first label may remain completely on the frame and battery cell when the frame is deformed or twisted. At least one of the first label or the second label may include a fabric of interwoven threads. The second label may overlap a protection circuit for the battery cell. The first label does no contact the second label.

BRIEF DESCRIPTION OF THE DRAWINGS

Features will become apparent to those of ordinary skill in the art by describing in detail exemplary embodiments with reference to the attached drawings in which:

FIGS. 4A and 4B illustrate another embodiment of a battery pack; and

DETAILED DESCRIPTION

Figure 1A:
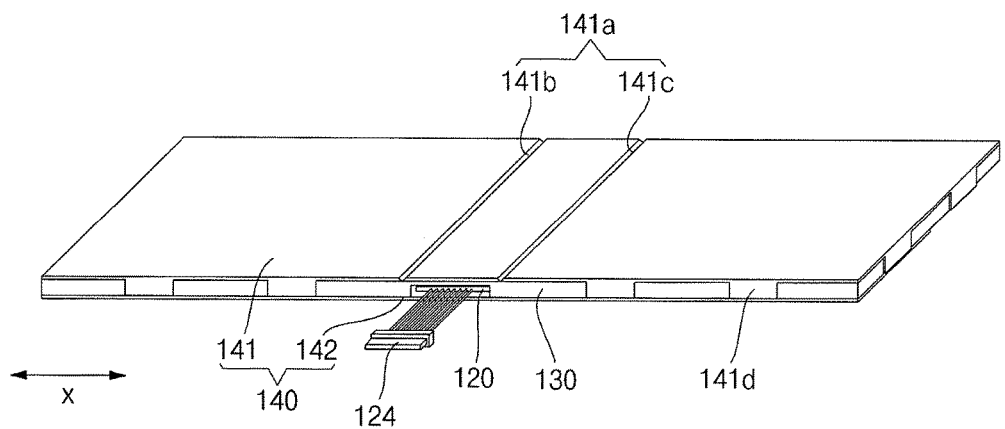
FIGS. 1A and 1B illustrate an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
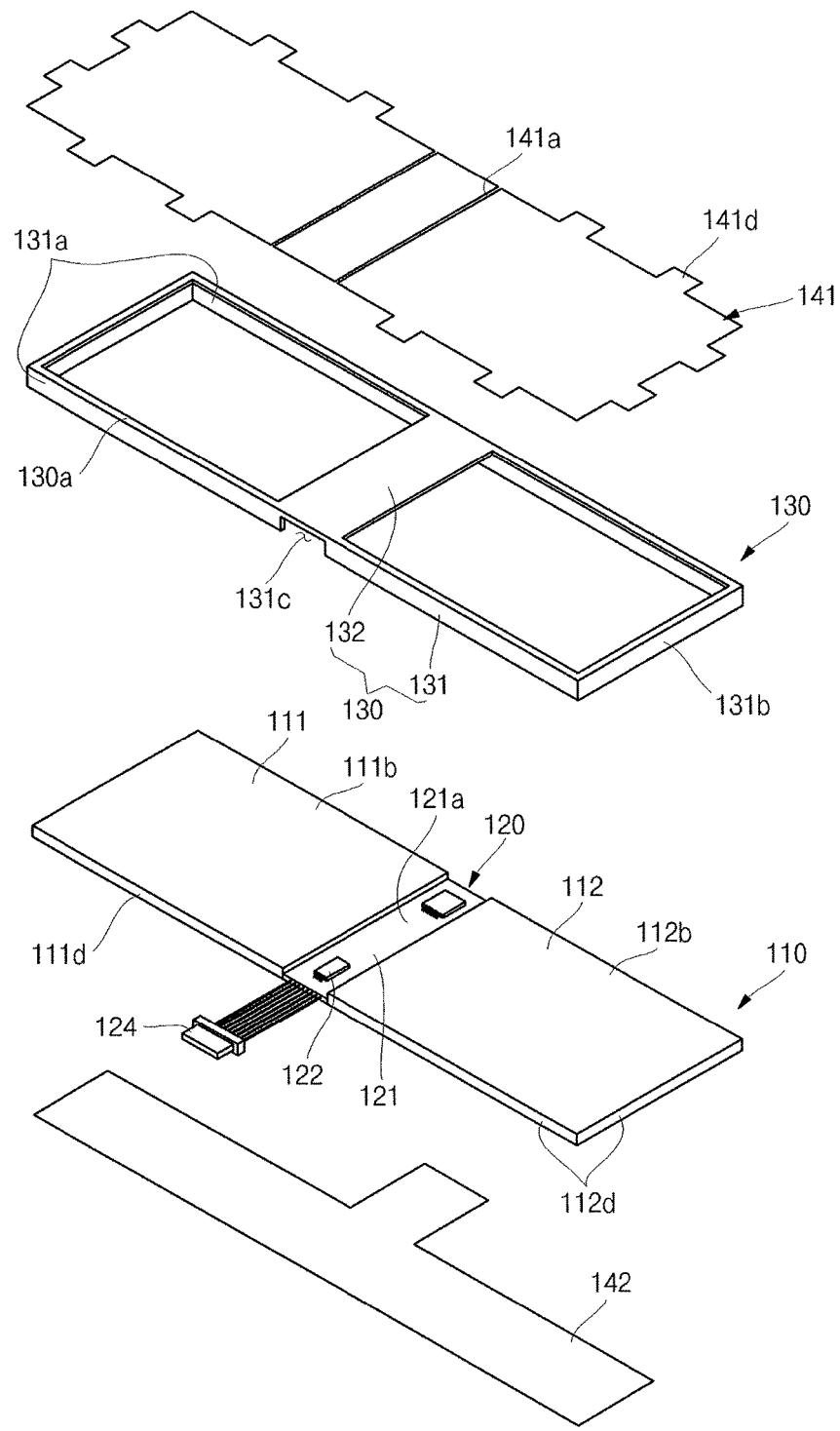

FIGS. 1A and 1B illustrate an embodiment of a battery pack 100 which includes at least one battery cell 110, a protection circuit module 120 electrically connected to the battery cell 110, a frame 130 to receive the battery cell 110 and protection circuit module 120, and at least one label 140 surrounding the battery cell 110, protection circuit module 120, and frame 130.

Figure 2:
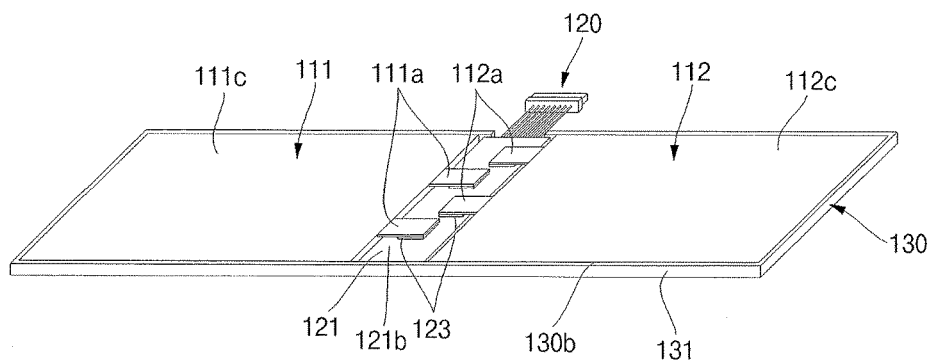
FIG. 2 illustrates the battery pack before attachment of a label.

FIG. 2 illustrates a bottom view of the battery pack in a state before label 140 is attached. As illustrated in FIG. 2, the at least one battery cell 110 may include a first battery cell 111 having an electrode tab 111a protruding to one side, and a second battery cell 112 having an electrode tab 112a protruding in a direction facing electrode tab 111a of the first battery cell 111. In one embodiment, the first battery cell 111 and second battery cell 112 may be arranged on a same plane, so that electrode tabs 111a and 112a extend in opposing directions. In other embodiments, electrode tabs 111a and 112a may be on different planes.

Electrode tabs 111a and 112a are electrically connected to the protection circuit module 120. The first battery cell 111 and second battery cell 112 may be pouch-type batteries, but this is not a necessity. Also, two battery cells are illustrated as being connected to the protection circuit module in FIG. 2. In other embodiments, the battery pack may include more than two battery cells, which may be arranged on the same plane or different planes and which may be electrically connected to the protection circuit module 120.

Also, the battery cells 111 and 112 may be slim-plate shaped battery cells. These cells may have respective first surfaces 111b and 112b that are planar and respective second surfaces 111c and 112c opposing the first surfaces 111b and 112b. The first surfaces 111b and 112b and the second surfaces 111c and 112c of the battery cells 111 and 112 may be shaped of rectangular plates.

In addition, the battery cells 111 and 112 may have four sidewalls 111d and 112d connecting four-sided edges of the first surfaces 111b and 112b and the second surfaces 111c and 112c, respectively. The battery cells 111 and 112 have the electrode tabs 111a and 112a protruding from one of the sidewalls 111d and 112d. In addition, the electrode tabs 111a and 112a of the battery cells 111 and 112 may have different polarities, or the electrode tabs 111a and 112a of each of the battery cells 111 and 112 may have different polarities. Also, the first battery cell 111 and the second battery cell 112 may have the same shape or different shapes.

The protection circuit module 120 may be positioned between one sidewall 111d of the first battery cell 111 from which the electrode tab 111a protrudes and one sidewall 112d of the second battery cell 112 from which the electrode tab 112a protrudes. That is, the first battery cell 111 and the second battery cell 112 may be connected to the protection circuit module 120 at opposing sides of the protection circuit module 120.

The protection circuit module 120 includes a circuit board 121 which may have multiple wiring patterns and which may be in the shape of a plate. In addition, the protection circuit module 120 may include a plurality of protection devices 122. The protection devices 122 may be formed on a first surface 121a of the circuit board 121. Conductive pads 123 may be formed on a second surface 121b of the circuit board 121 opposing the first surface 121a. The conductive pads 123 may be connected to the electrode tabs 111a and 112a of the battery cell 110. That is, the protection circuit module 120 is electrically connected to the electrode tabs 111a and 112a through the conductive pads 123 formed on the circuit board 121.

In addition, the protection circuit module 120 is electrically connected to one end of the circuit board 121, and may further include an external terminal 124 protruding a predetermined length at one side of the frame 130. The external terminal 124 may be electrically connected to the wiring patterns of the circuit board 121. That is, the external terminal 124 may be electrically connected to the battery cell 110 through the circuit board 121. The battery cell 110 may be charged or discharged through the external terminal 124.

In addition, a first surface of the protection circuit module 120 may correspond to the first surface 121a of the circuit board 121. A second surface of the protection circuit module 120 may correspond to the second surface 121b of the circuit board 121. The first surface 121a of the protection circuit module 120, the first surface 111b of the first battery cell 111, and the first surface 112b of the second battery cell 112 may correspond to a top surface of FIG. 1B. The second surface 121b of the protection circuit module 120, the second surface 111c of the first battery cell 111 and the second surface 112c of the second battery cell 112 may correspond to a bottom surface of FIG. 1B.

The frame 130 receives the battery cell 110 and the protection circuit module 120, and protects the same from external surroundings. The frame 130 includes a first frame section 131 and a second frame section 132. The first frame section 131 may be a rectangular framework surrounding outer surfaces of the first and second battery cells 111 and 112 connected to the protection circuit module 120. The second frame section 132 may be attached to or integrally formed with the first frame section 131, and may be shaped of a plate covering the first surface 121a of the protection circuit module 120.

The first frame section 131 may have one side edge 130a connected to the second frame section 132. The first frame section 131 may also have a hole 131c for allowing the external terminal 124 of the protection circuit module 120 to be exposed the outside. The hole 131c may be provided at the other side edge 130b opposite to the one side edge 130a.

In addition, one side edge of the frame 130 may correspond to the one side edge 130a of the first frame section 131. The other side edge of frame 130 may correspond to the other side edge 130b of the first frame section 131. The one side edge 130a of the first frame section 131 may be positioned on the same plane as the first surface 111b of the first battery cell 111 and the first surface 112b of the second battery cell 112. The other side edge 130b of the frame 130 may be positioned on the same plane as the second surface 111c of the first battery cell 111 and the second surface 112c of the second battery cell 112. In alternative embodiments, side edges 130a and 130b may be on different planes from the first surfaces of the first and second battery cells and from second surfaces of the first and second battery cells, respectively.

The first battery cell 111, the protection circuit module 120, and the second battery cell 112 may be arranged in a line in a lengthwise direction x of the first frame section 131. The first frame section 131 may have two lengthwise sidewalls 131a and two widthwise sidewalls 131b connecting the two lengthwise sidewalls 131a.

The exposing hole 131c may be formed at the lengthwise center of one of the lengthwise sidewalls 131a. The exposing hole 131c may be formed at a location corresponding to the second frame section 132.

The second frame section 132 may be roughly in the shape of a plate, and may connect the two lengthwise sidewalls 131a of the first frame section 131. Preferably, the second frame section 132 may connect lengthwise centers of the two lengthwise sidewalls 131a. The second frame section 132 covers the first surface 121a of the protection circuit module 120 received in the frame 130. The second frame 132 is preferably sized to entirely cover the first surface 121a of protection circuit module 120.

The at least one label 140 may include a first label 141 adhered to the one side edge 130a of the frame 130 and a second label 142 adhered to the other side edge 130b of the frame 130. The label 140 may be adhered to the frame 130, for example, by an adhesive component on its surface facing the frame 130. The label 140 may be made of polyethylene terephthalate (PET) or another material.

The first label 141 is adhered to the one side edge 130a of the frame 130, and is also adhered to the first surface 111b of the first battery cell 111 and the first surface 112b of the second battery cell 112. In addition, the first label 141 is also adhered to the second frame section 132 of the frame 130. That is, the first label 141 is adhered to the frame 130, the first battery cell 111, and the second battery cell 112 so as to entirely cover the one side edge 130a of the frame 130.

The first label 141 includes a noise preventing portion 141a (or stabilizer), which may be formed in a direction perpendicular to the lengthwise direction of the frame 130. The noise preventing portion 141a is a cut-out portion that is cut in a widthwise direction of the frame 130, which extends in a different direction (e.g., perpendicular) to the lengthwise direction of the frame 130.

Figure 3:
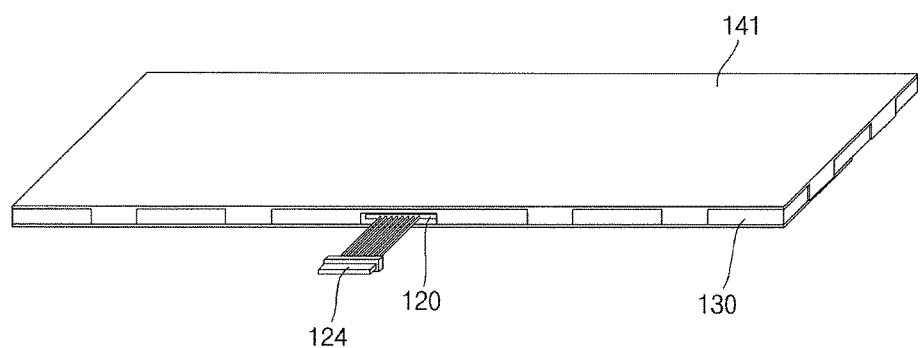
FIG. 3 illustrates the battery pack before formation of a cut-out portion.

FIG. 3 illustrates a state in which the first label 141 is adhered to cover one side edge 130a of the frame 130. That is, the noise preventing portion 141a is a cut-out portion that separates the first label 141 in the widthwise direction perpendicular to the lengthwise direction of the frame 130, after the first label 141 is adhered to cover the one side edge 130a of the frame 130 and the battery cell 110.

The cut-out portion (as the noise preventing portion 141a) may be formed between the frame 130 and the battery cell 110. More specifically, the cut-out portion may include a first cut-out portion 141b and a second cut-out portion 141c. The first cut-out portion 141b may be formed between the second frame section 132 and the first battery cell 111. The second cut-out portion 141c may be formed between the second frame section 132 and the second battery cell 112. That is, the first label 141 may be configured such that two cut-out portions 141a (that are cut in the widthwise direction of the frame 130) are formed at locations corresponding to edges of the second frame section 132, respectively.

Because the first label 141 has a boundary portion between the second frame section 132 and the battery cell 110, the boundary portion separated by the noise preventing (cut-out) portion 141a prevents a surface adhered to the frame 130 or the battery cell 110 from being released from the frame 130 or the battery cell 110 due to twisting stress applied between opposite widthwise sidewalls 131b of the frame 130. Therefore, the cut-out portion 141a of label 140 may prevent noise from occurring as a result of twisting or bending, especially at the boundary portion between the second frame section 132 and the battery cell 110.

The first label 141 extends up to the other side edge 130b of the frame 130. The first label 141 may further include a plurality of fixing portions 141d, surrounding an outer portion of the frame 130, to adhere and fix the label 140.

The second label 142 is adhered to the other side edge 130b of the frame 130, and is also adhered to the second surface 111c of the first battery cell 111 and the second surface 112c of the second battery cell 112. The second label 141 is also adhered to the second surface 121b of the protection circuit module 120. The second label 142 may be adhered to entirely cover the second surface 121b of the protection circuit module 120, and may be adhered to partially cover the second surface 111c of the first battery cell 111 and the second surface 112c of the second battery cell 112.

The second label 142 may expose one of the lengthwise sidewalls 131a of the other side edge 130b of the frame 130 to the outside. That is, the second label 142 may have substantially a T-shape, and may be adhered to entirely cover the second surface 121b of the protection circuit module 120 and to cover the first battery cell 111, the second battery cell 112 and a portion of the other side edge 130b of the frame 130.

As previously indicated, the battery pack of the first embodiment includes noise preventing portion 141a, that is a cut-out portion corresponding to a boundary portion between the frame 130 and the battery cell 110. Thus, it is possible to prevent the adhered surface of the label from being released from the frame 130 and the battery cell 110, thereby preventing noise from occurring due to movement of the adhered surface.

Figure 4A:
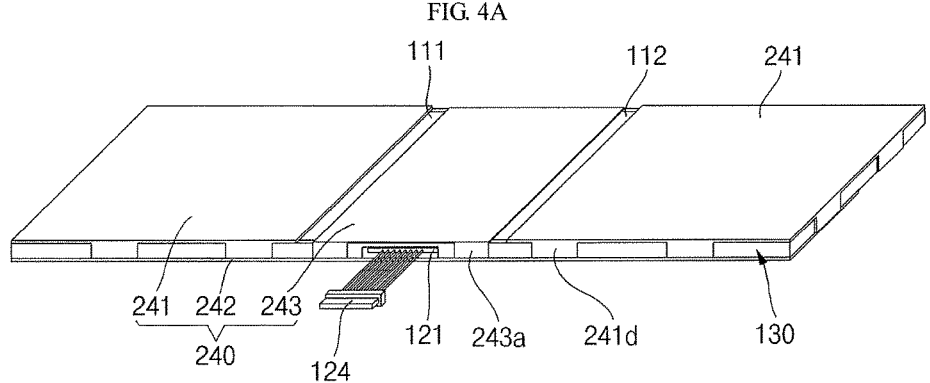

FIGS. 4A and 4B illustrate another embodiment of a battery pack 200 which includes a battery cell 110, a protection circuit module 120 electrically connected to the battery cell 110, a frame 130 to receive the battery cell 110 and the protection circuit module 120, and at least one label 240 surrounding the battery cell 110, the protection circuit module 120, and the frame 130.

As illustrated in FIGS. 4A and 4B, the battery pack 200 is substantially the same as the battery pack 100 in FIGS. 1A and 1B in terms of the battery cell 110, the protection circuit module 120, and the frame 130. Therefore, the following description will focus on label 240, which is a different feature from the battery pack 100 in FIGS. 1A and 1B.

The at least one label 240 includes a first label 241, a second label 242 adhered to the other side edge 130b of the frame 130, and a third label 243 that serves as a noise preventing portion. The third label 243 is adhered to cover the second frame section 132 in a direction perpendicular to a lengthwise direction of the frame 130. The first, second, and third labels cover one side edge 130a of the frame 130, a portion of a first surface 111b of the first battery cell 111, and a portion of a first surface 112b of the second battery cell 112, respectively. The label 240 may be adhered to the frame 130 by an adhesive component provided on a surface facing the frame 130.

The first label 241 is adhered to the one side edge 130a of the frame 130 and is also adhered to the first surface 111b of the first battery cell 111. In addition, the first label 241 is adhered to the one side edge 130a of the frame 130 and is also adhered to the first surface 112b of the second battery cell 112. That is, two first labels 241 may be adhered to a plurality of battery cells 110 and may be symmetrical to each other with respective to second frame section 132. The first label 241 may expose portions of the first surfaces 111b and 112b, which are adjacent to one side of each of the first battery cell 111 and second battery cell 112 from which electrode tabs 111a and 112a protrude.

The first label 241 extends up to the other side edge 130b of the frame 130. The first label 241 may include a plurality of fixing portions 241d for surrounding an outer portion of the frame 130 and to adhere and fix the first label 241.

The second label 242 is adhered to the other side edge 130b of the frame 130. The second label 242 is also adhered to a second surface 111c of the first battery cell 111 and a second surface 112c of the second battery cell 112. In addition, the second label 241 is also adhered to a second surface 121b of the protection circuit module 120. The second label 242 may be adhered to entirely cover the second surface 121b of the protection circuit module 120, and may be adhered to cover the second surface 111c of the first battery cell 111 and a portion of the second surface 112c of the second battery cell 112. The second label 242 may expose one of the lengthwise sidewalls 131a of the other side edge 130b of the frame 130 to the outside.

In one embodiment, the second label 242 may have a substantially T-shape, and may be adhered to entirely cover the second surface 121b of the protection circuit module 120. The second label 242 may cover the first battery cell 111, the second battery cell 112, and a portion of the other side edge 130b of the frame 130.

The first label 141 and the second label 242 may be made of polyethylene terephthalate (PET) or another material.

The third label 243 may be adhered to cover the second frame section 132 as a noise preventing portion. The third label 243 may also be adhered to cover portions of the first surfaces 111b and 112b adjacent to one sides of the first battery cell 111 and the second battery cell 112 from which the electrode tabs 111a and 112a protrude. That is, the third label 243 may be adhered to one side edge 130a of the frame 130 to cover boundary portions between the second frame 132 and the battery cells 110.

The third label 243 may be positioned between two first labels 241 adhered to the first battery cell 111 and the second battery cell 112. That is, the first labels 141 may be adhered to the first battery cell 111 and the second battery cell 112, in an arrangement that is symmetrical with respect to the third label 243. The third label 243 extends up to the other side edge 130b of the frame 130. The third label 243 may further include a plurality of fixing portions 243d for surrounding the outer portion of the frame 130 and to adhere and fix the third label 243.

Figure 5:
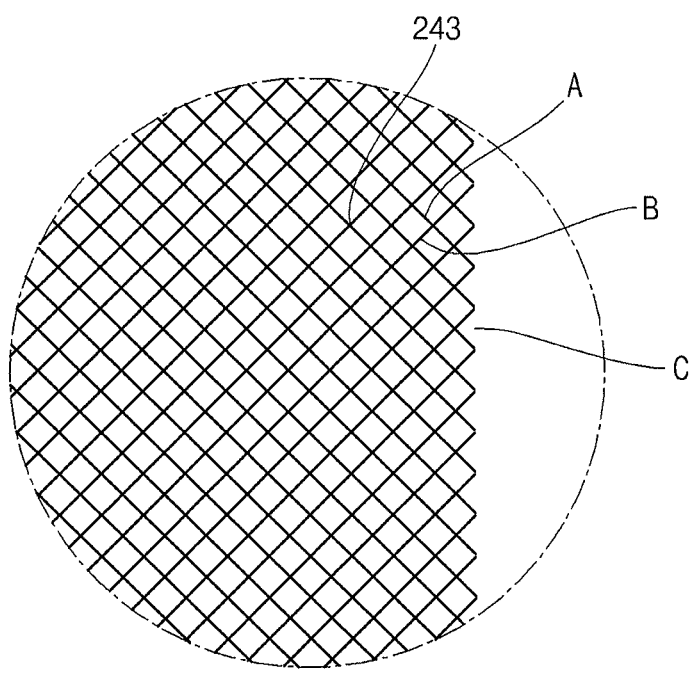
FIG. 5 illustrates a portion of the battery pack in FIG. 4A.

The third label 243 may be made of, for example, a fabric material having flexibility. One example of such a material is fabric-type acetate. When the third label 243 is a fabric-type label, the third label 243 may be configured such that warp threads A and weft threads B cross each other, as shown in FIG. 5. Because the third label 243 has a plurality of air passageways due to presence of the warp threads A and the well threads B crossing each other, air permeability and a heat dissipating property of the battery pack can be improved.

In one embodiment, the third label 243 may have an edge C at a predetermined angle without being perpendicular or parallel to the warp threads A and the well threads B. The predetermined angle may be, for example, in a range of 30 to 60 degrees. More specifically, in order to prevent the warp threads A and the well threads B from being unwound from the edge C (which may be a cut surface), the third label 243 may be cut in a bias direction of the fabric, so that an angle between each of the warp threads A and each of the well threads B may be a predetermined angle, e.g., 45 degrees.

The third label 243, serving as the noise preventing portion, may be made of a flexible fabric-type material. The third label 243 may prevent a surface adhered to the frame 130 or the battery cell 110 from being released from the frame 130 or the battery cell 110, even if twisting occurs between opposite widthwise sidewalls 131b of the frame 130. Therefore, by using the third label 243 as the noise preventing portion, the adhered surface of a boundary portion between the second frame section 132 and the battery cell 110 is not released, thereby preventing noise from occurring when the adhered surface is bent, twisted, or otherwise moved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
at least two battery cells;
a protection circuit module electrically connected to the at least one battery cell;
a frame including the at least two battery cells and the protection circuit module; and
at least one label adjacent to the at least two battery cells, protection circuit module, and frame, wherein the label includes at least one discontinuous portion extending in a direction different from a lengthwise direction of the frame and wherein the at least one discontinuous portion is between the at least one battery cell and a portion of the frame adjacent to the protection circuit module;
wherein the discontinuous portion includes at least one cut-out portion or includes a fabric-type label.

2. The battery pack as claimed in claim 1, wherein the at least one discontinuous portion includes a cut-out portion in the direction different from the lengthwise direction of the frame.

3. The battery pack as claimed in claim 1, wherein the at least one discontinuous portion includes a fabric-type label.

4. The battery pack as claimed in claim 3, wherein the fabric-type label includes an acetate material.

5. The battery pack as claimed in claim 1, wherein the at least two battery cells includes a first battery cell and a second battery cell, and wherein each of the first and second battery cells has at least one electrode tab.

6. The battery pack as claimed in claim 5, wherein the electrode tab of the first battery cell and the electrode tab of the second battery cell face each other, and are connected to the protection circuit module at opposing sides of the protection circuit module.

7. The battery pack as claimed in claim 6, wherein the frame includes:
- a first frame section including a rectangular framework, the first frame section surrounding outer surfaces of the first and second battery cells connected to the protection circuit module, and
- a second frame section coupled to the first frame section and having a plate shape covering a first surface of the protection circuit module.

8. The battery pack as claimed in claim 7, wherein the at least one label includes:
- a first label covering a first surface of the first battery cell, a first surface of the second battery cell, and the second frame section, the first label including the at least one discontinuous portion; and
- a second label covering a second surface of the first battery cell opposite to the first surface of the first battery cell and a second surface of the second battery cell opposite to the first surface of the second battery cell.

9. The battery pack as claimed in claim 8, wherein the first label includes a fixing portion adhered to a portion of the first frame section and fixing the first label.

10. The battery pack as claimed in claim 7, wherein the at least one discontinuous portion includes a first cut-out portion between the first battery cell and second frame section and a second cut-out portion between the second battery cell and the second frame section.

11. The battery pack as claimed in claim 7, wherein the at least one label includes:
- a first label covering a portion of a first surface of the first battery cell and a portion of a first surface of the second battery cell;
- a second label covering a second surface of the first battery cell opposite to the first surface of the first battery cell and a second surface of the second battery cell opposite to the first surface of the second battery cell; and
- a third label that includes a fabric-type portion covering the second frame section.

12. The battery pack as claimed in claim 11, wherein the third label covers a portion of the first surface of the first battery cell adjacent to the second frame section and a portion of the first surface of the second battery cell.

13. The battery pack as claimed in claim 12, wherein:
- the third label is made of an acetate fabric having warp threads and weft threads crossing each other, and
- edges of the third label are at a predetermined angle relative to the warp threads and the weft threads, the predetermined angle being different from 90°.

14. The battery pack as claimed in claim 11, wherein the third label includes a fixing portion adhered to a portion of the first frame section and fixing the third label.

* * * * *